Figure 1:
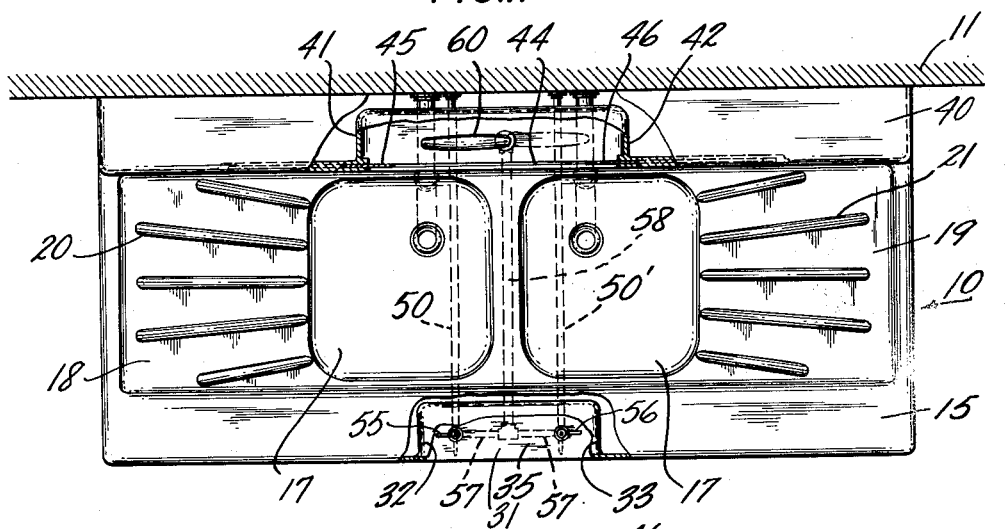

Jan. 7, 1958   R. W. MILLER   2,818,581
COMBINATION KITCHEN SINK
Filed Sept. 5, 1956   2 Sheets-Sheet 1

INVENTOR.
RUDOLPH W. MILLER
BY
ATTORNEYS

Jan. 7, 1958 R. W. MILLER 2,818,581
COMBINATION KITCHEN SINK
Filed Sept. 5, 1956 2 Sheets-Sheet 2

INVENTOR.
RUDOLPH W. MILLER
BY
ATTORNEYS

United States Patent Office 2,818,581
Patented Jan. 7, 1958

2,818,581
COMBINATION KITCHEN SINK
Rudolph W. Miller, Brooklyn, N. Y.
Application September 5, 1956, Serial No. 608,141
7 Claims. (Cl. 4—187)

This invention relates to faucets or valves and especially to faucets or valves in combination with a kitchen sink, particularly the flush or bare deck type combination sink, characterized by its being mounted in a base cabinet.

One aspect of modern home life seems to require that the housewife be provided with an attractive well-designed efficient kitchen sink. It has become customary in the past few years to provide base cabinets for kitchen use which are characterized by their being about 3 feet high, the cabinets having mounted therein a kitchen sink of the size or style desired by the housewife. Entire kitchen units are designed to surround such installations. Conventional plumbing seems to have carried through in such units in that the sink, while being mounted flush with the work surface forming the top of the unit, has mounted in it a swivel type faucet with adjacent hot and cold water inlet valves. These units always have the faucet and the valve handles mounted on the sink ledge or what would be the rear of the kitchen counter top. The result is that the housewife at work is required to reach across the sink to manipulate the valves to regulate water flow.

Although these conventional units are attractive, useful and even reasonably efficient, it has been found that unless the height of the base cabinet is ideally adjusted to the height of the housewife, her leaning at slight angles over the kitchen sink to manipulate valves can be a real inconvenience. It is, accordingly, a fundamental object of this invention to provide a kitchen base cabinet and sink unit in combination with a faucet characterized by its having water controls at the front of the cabinet, immediately adjacent to the position in which the housewife will stand in her work at the kitchen sink.

It is another object of the invention to provide a new kitchen base cabinet and sink combination unit having the control valves recessed in a position directly adjacent to that occupied by the housewife when the cabinet is in use.

It is another object of the invention to provide a kitchen cabinet with the water faucet or spout pivoted and recessed so that it can be concealed when it is not in active use.

Other objects and advantages of the invention will in part be obvious and in part appear hereinafter.

The invention, accordingly, consists of a fixture comprising a faucet having control valves placed at a point removed therefrom, which may be in combination with a base cabinet-kitchen sink unit characterized by its having a kitchen sink and plumbing connections including the said valves for hot and cold water and a swivel or pivotally mounted mixing faucet or spout, the fixture being further characterized by the location of the control valves adjacent to the position in which the housewife will stand, whereas the spout itself will be on the opposite side of the sink in essentially the accepted conventional position.

Figure 2:
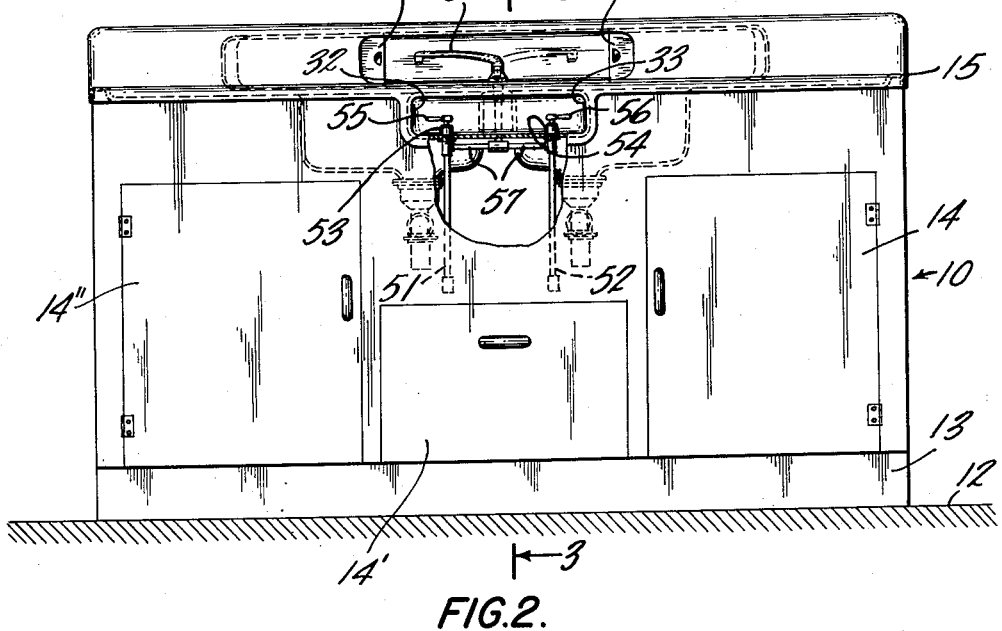
Figures 3, 4:
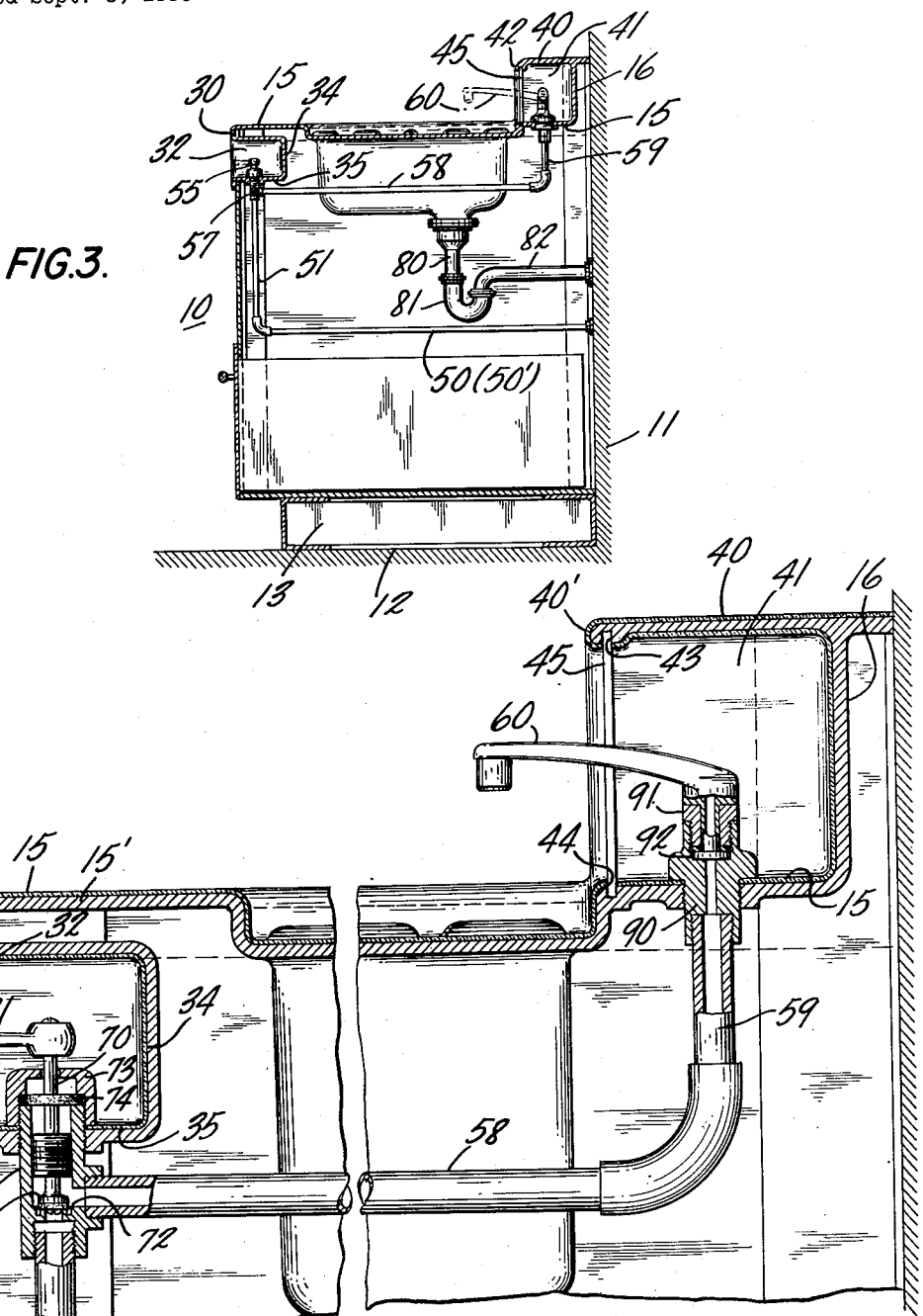

Referring now to the drawings:

Figure 1 represents a plan view of a typical form of the device;
Figure 2 is a front elevation of the sink shown in Figure 1;
Figure 3 is a section taken along the line 3:3 of Figure 2;
Figure 4 is a section corresponding to one taken along the line 3:3 of a unit constituting a variant of that shown in Figure 2.

Referring now to Figures 1 and 2, 10 represents a base cabinet which is mounted against wall 11 and levelled on a floor 12 in conventional style, for example, in a kitchen. Further, in what is also the accepted style of cabinets, a base 13 narrower than the cabinet is mounted under the entire unit and forms a part thereof to provide the usual toe recess, as seen in Figure 3. The cabinet itself may be formed of sheet metal, wood or other structural cabinet material, and, as is typical of the unit in which a kitchen sink is mounted, it has a plurality of doors 14, 14' and 14" on the front face which provide access to internal compartments of the unit.

The top or counter 15 is characterized by its being slightly wider than the cabinet to create a slight forward overhang over the cabinet; it also extends back to the wall 11, where it is turned up for a distance of a few inches to form a back splashboard 16.

In the unit shown in Figure 1, the counter top is finished by providing a two-tray sink having trays 17 and 17' with matching drainboards 18 and 19. The drainboards in this instance are shown with slight directional corrugations 20 and 21 to direct the flow of drainage into the sinks. The two-tray sink frequently carries with it the variation shown in Figure 4 where one tray, here the left hand one, is deep and functions as a simple laundry tray.

To this extent the structural parts of the base cabinet, sink units and their mounting next to the wall carrying the basic plumbing are conventional, but the precise size of sink, or combination and arrangement of tray units, will vary to suit the taste or needs of the individual for whom the installation is being made.

For purposes of this invention, as shown in greatest detail in Figures 3 and 4, the base cabinet with the sink trays, which has been mounted adjacent to the wall 11 carrying the plumbing, has counter top 15 turned down, to form a forward lip 30. The cabinet, immediately under the lip and directly in front of the sink is recessed to receive the box 31 having sides 32, 33, back 34 and bottom 35, which box in the embodiment shown is formed as part of the counter top 15. Similarly, counter top 15 is carried to back splashboard 16, which is carried forward to form a top 40 several inches forward from the board 16. This top together with sides 41 and 42 and the corresponding section of the counter top 15 form a box or recess at the rear side of the sink.

The relationship of the recessed section or boxes to each other and to the sink unit is best seen by inspection of Figures 1 and 2. In the forward edge of the box thus defined, lip 40' is provided with groove 43; corresponding groove 44 is provided directly beneath 43, in the counter top 15 to receive the sliding doors 45—46 so that the box formed may be closed.

As shown in detail in Figures 3 and 4 the plumbing is connected to the kitchen sink by being brought through the wall 11 with the horizontal runs 50 and 50' which feed to the verticals 51 and 52, thence to the valves 53 and 54, which have handles 55 and 56, and feed into the line 57, which becomes the common feeding-mixing line 58, which in turn feeds line 59, and the pivoted faucet 60.

Details of typical fittings required for this structure are shown in Figure 4 where the counter top 15 mounted on the structural base 15' is shown turned to form lip 30 and the box 31 within which the valves 53 and 54 are shown mounted on the bottom 35 of the box. The plumbing connection shows line 51 feeding to typical valve body 53 within which the threaded stem 70 in conventional manner seats and unseats the washer or disk 71 on the valve seat 72. The bonnet 73 is threaded on to the body 53 and forms a water tight connection with the washer 74, while seating firmly against the box bottom 35. It will be apparent that the structural unit or box 31 to suffice for this purpose should provide a recess and secure base for mounting the valve in place.

It will also be apparent that an equally useful orientation of valves is to mount them on back 34 of the recess, rotated essentially 90° from the position shown, so that stem 70 is horizontal.

Sink drain connections are of conventional form and are shown with drain 80 leading to trap 81 which in turn leads to drain line 82, and thence to such other permanent drain as may be provided for the final connection.

The connection to the pivoted spout itself is shown in some detail in Figure 4 where 59 is the vertical feed line which connects to the mixing valve bushing 90 which is fixed in waterproof fashion to the deck 15. The remaining details of the pivoted faucet connection may be of conventional type; as shown, it merely provides for the faucet 60 to be pivoted around the bushing 91 with the gasket 92 compressed by bushing 91 providing the waterproof connection at this joint.

It is to be understood that the details of the structure of the pivoted faucet and the manner of its being mounted flush in the deck or in a sink ledge may be varied to suit the needs of any particular case, it being necessary only that the connection to the deck be a leak-proof one.

In Figure 4 also it will be apparent that the splashboard 16 has been brought forward at 43 to form a recess which carries doors 45 and 46 in its forward opening. When the faucet is not in use it may be turned to one side or the other completely within the enclosure or box 41 and the doors 45—46 closed to keep it concealed and out of reach.

In conventional installations, it is customary to have the water pipe come through the adjacent wall, or subjacent floor and feed directly to the valves at the rear of the sink. Because the sink is spaced only a few inches from the wall, completion of the plumbing connections to the valves and faucet is difficult and requires much skill. Furthermore, access to the connections to permit repair or replacement at a future date is made extremely awkward by the very narrow work space between the sink and the wall.

Accordingly, as will be apparent from the drawings, this invention provides for much easier access to the plumbing, both valves and faucet, by placing the valves at the front of the cabinet.

In Figures 1 and 2, a two-tray sink has been drawn and here it will be apparent that the horizontal pipe run 50 may be between sinks. In Figure 4, where a shallow tray and a single deep tray sink are shown the horizontal run 50 again will be between trays. Where a single tray unit is used, the horizontal run may be under the sink, e. g., at a level slightly below that of the feed line 57 in Figure 3, or it may be at a level approximating that at which the valves are mounted, in which case it must be brought around the tray.

Inasmuch as much domestic plumbing is now done with copper tubing, the exact course of pipe run is not important, because the tubing is flexible enough to permit its being adapted to practically any space limitation.

What is claimed is:

1. In a kitchen cabinet comprising the combination of a base cabinet having a forward working face, counter top with forward and rear edges and a sink mounted in said counter top, said sink being oriented in accordance with the forward and rear edges of said counter top, the improvement comprising water inlet connections for said sink having valve controls for said water substantially entirely behind the forward working face of said cabinet, immediately below counter top level and spout for water feed to the sink at the oppositely disposed rear edge of said sink.

2. A kitchen base cabinet-sink combination, comprising a base cabinet having a forward working face, a top therefor having forward and rear edges, and a sink mounted in said top, said sink being oriented in accordance with the forward and rear edges of said counter top, said combination being characterized by its having provision for water connections thereto wherein water inlet controls are disposed at the forward edge of said sink immediately below cabinet top level and substantially at hand level for an operator substantially entirely behind said forward working face, the water inlet spout for said sink being mounted adjacent to the rear edge of said sink.

3. A kitchen cabinet-sink combination in accordance with claim 2 wherein said water inlet controls are disposed within a recessed compartment in said forward face of the cabinet and said water inlet spout is also disposed within a recessed compartment at said rear edge of said sink.

4. A unit for use with kitchen cabinet installations having a forward working face comprising an extended flat working surface base having a forward working edge and a rear edge, a sink mounted in said unit, said base having a box formed under the forward working edge thereof substantially centered on the sink, and flush with the forward working face and valve connections in said box substantially entirely behind said forward working face for receiving water lines and feeding water to a spout at the rear of said sink.

5. A kitchen counter top for use with cabinet structures comprising a base, a working surface on said base, and an opening in said base and working surface adapted to receive a kitchen sink, said base having a forward working edge and a rear edge, means mounted under the forward working edge of said base substantially centered on said opening to receive valve connections for water control to said kitchen sink, such that said valve connections are substantially entirely within a forward working edge of said base, and means at the rear edge of said base to receive spout connections.

6. A combination in accordance with claim 5 in which said base has a recess formed at the rear edge thereof, said recess being adapted to house spout connections at the rear edge of said sink.

7. A combination in accordance with claim 6 in which said means for receiving valve connections is a box substantially at hand level, immediately below said forward working edge of said counter top.

References Cited in the file of this patent

UNITED STATES PATENTS

| | | |
|---|---|---|
| 867,580 | Hooper | Oct. 8, 1907 |
| 1,931,212 | Topp | Oct. 17, 1933 |
| 1,982,117 | Murie | Nov. 27, 1934 |
| 2,026,804 | Sterling | Jan. 7, 1936 |
| 2,558,443 | Krenov | June 26, 1951 |
| 2,658,323 | Colonna | Nov. 10, 1953 |
| 2,673,352 | Knowles | Mar. 30, 1954 |